United States Patent [19]

Kojima

[11] Patent Number: 4,980,855
[45] Date of Patent: Dec. 25, 1990

[54] INFORMATION PROCESSING SYSTEM WITH DEVICE FOR CHECKING SPELLING OF SELECTED WORDS EXTRACTED FROM MIXED CHARACTER DATA STREAMS FROM ELECTRONIC TYPEWRITER

[75] Inventor: Yasumichi Kojima, Nagoya, Japan

[73] Assignee: Brother Kogyo Kabushiki Kaisha, Nagoya, Japan

[21] Appl. No.: 89,267

[22] Filed: Aug. 25, 1987

[30] Foreign Application Priority Data

Aug. 29, 1986 [JP] Japan ............... 61-204535

[51] Int. Cl.⁵ .................. G06F 3/09; G06F 7/02; G06F 12/02; G06F 15/21
[52] U.S. Cl. .................. 364/900; 364/928; 364/930; 364/936; 364/957.6; 364/975; 364/943.41; 364/943.43; 340/711; 400/63; 400/74
[58] Field of Search ... 364/200 MS File, 900 MS File; 400/63

[56] References Cited

U.S. PATENT DOCUMENTS

| | | | |
|---|---|---|---|
| 3,780,846 | 12/1973 | Kolpek et al. | 340/146.1 R |
| 3,995,254 | 11/1976 | Rosenbaum | 340/146.3 WD |
| 4,041,467 | 8/1977 | Cota et al. | 364/900 |
| 4,136,395 | 1/1979 | Kolpek et al. | 364/518 |
| 4,198,906 | 4/1980 | Fujikawa et al. | 400/74 |
| 4,218,760 | 8/1980 | Levy | 364/900 |
| 4,323,315 | 4/1982 | Demonte et al. | 400/63 |
| 4,328,561 | 5/1982 | Convis et al. | 364/900 |
| 4,339,806 | 7/1982 | Yoshida | 364/900 |
| 4,355,371 | 10/1982 | Convis et al. | 364/900 |
| 4,383,307 | 5/1983 | Gibson | 364/900 |
| 4,408,302 | 10/1983 | Fessel et al. | 364/900 |
| 4,413,318 | 11/1983 | Herrington | 364/200 |
| 4,420,817 | 12/1983 | Yoshida | 364/900 |
| 4,438,505 | 3/1984 | Yanagiuchi et al. | 364/900 |
| 4,439,836 | 3/1984 | Yoshida | 364/900 |
| 4,456,969 | 6/1984 | Herzik et al. | 364/900 |
| 4,467,446 | 8/1984 | Sakurai | 364/900 |
| 4,498,148 | 2/1985 | Glickman | 364/900 |
| 4,499,553 | 2/1985 | Dickinson et al. | 364/900 |
| 4,502,128 | 2/1985 | Okajima et al. | 364/900 |
| 4,503,426 | 3/1985 | Mikulski | 340/711 |
| 4,503,514 | 3/1985 | Urquhart | 364/900 |
| 4,548,520 | 10/1985 | Ueno | 400/63 |
| 4,559,598 | 12/1985 | Goldwasser et al. | 364/419 |
| 4,564,301 | 1/1986 | Ueno | 400/63 |
| 4,567,573 | 1/1986 | Hashimoto et al. | 364/900 |
| 4,580,241 | 4/1986 | Kucera | 364/900 |
| 4,584,667 | 4/1986 | Hashimoto et al. | 364/900 |
| 4,590,560 | 5/1986 | Sado | 364/419 |
| 4,594,686 | 6/1986 | Yoshida | 364/900 |
| 4,611,995 | 9/1986 | Sado | 434/157 |
| 4,651,300 | 3/1987 | Suzuki et al. | 364/900 |
| 4,655,620 | 4/1987 | Adams et al. | 400/63 |
| 4,671,684 | 6/1987 | Kojima et al. | 400/63 |
| 4,672,571 | 6/1987 | Bass | 364/900 |

FOREIGN PATENT DOCUMENTS

| | | |
|---|---|---|
| 0097818 | 1/1984 | European Pat. Off. . |
| 0187454 | 7/1986 | European Pat. Off. . |
| 59-26280 | 2/1984 | Japan . |
| 1572709 | 7/1980 | United Kingdom . |

OTHER PUBLICATIONS

B. A. Barker et al., "Method for Detecting and Correcting Selected Word Spelling Errors in a Text Processing System", *IBM Technical Disclosure Bulletin*, vol. 25, No. 8, Jan. 1983, p. 4225.

I. H. Hernandez et al., "Interactive Spelling Correction Aid for a Text Processing System", *IBM Technical Disclosure Bulletin*, vol. 25, No. 8, Jan. 1983, pp. 4227–4228.

*Primary Examiner*—Archie E. Williams, Jr.
*Assistant Examiner*—Ayni Mohamed
*Attorney, Agent, or Firm*—Oliff & Berridge

[57] ABSTRACT

A date checking system optionally attached to a host device like a typewriter has two buffers, a predetermined cut-out rule and a dictionary ROM. A data queue from the host device is temporarily stored in one of the buffers, and then one word is cut out therefrom by cut-out codes like a space or punctuation mark to be stored in another buffer, where the word is locked up in the dictionary ROM to determine if the spelling thereof is correct.

2 Claims, 6 Drawing Sheets

OTHER PUBLICATIONS

D. Wendel et al., "Using the ON Mode", *CPT Spelling Checker I*, Mar. 1983, 4 pages.

V. A. Mayfield, "8-Bit Character Encoding for Multiple Languages", *IBM Technical Disclosure Bulletin*, vol. 26, No. 2, Jul. 1983, p. 537.

P. S. Cohen et al., "Video Disc Dictionary System", *IBM Technical Disclosure Bulletin*, vol. 25, No. 8, Jan. 1983, p. 4209.

T. L. Adam et al., "Spelling, Processing Functions Operator Interface", *IBM Technical Disclosure Bulletin*, vol. 24, No. 10, Mar. 1982, pp. 5003–5008.

R. Hackett, "Spelling Checking Typewriter", *IBM Technical Disclosure Bulletin, vol. 18, No. 2, Jul. 1975, pp. 530–531.*

INFORMATION PROCESSING SYSTEM WITH DEVICE FOR CHECKING SPELLING OF SELECTED WORDS EXTRACTED FROM MIXED CHARACTER DATA STREAMS FROM ELECTRONIC TYPEWRITER

BACKGROUND OF THE INVENTION

This invention relates to an information processing system for cutting out a significant block of data, e.g., a word, from a data queue to check the block of data. It is applicable to an external spelling check device for an electronic typewriter.

In the prior art, a spelling check apparatus adaptable to a host device, e.g., a typewriter, receives information which the host device previously divided into words. An apparatus of this type is described in U.S. Pat. No. 4,651,300. In this patent, the host word processor determines completion of inputting of each word, and transmits data word-by-word to a spelling collating apparatus. The spell collating apparatus checks each word input from the host processor, but cannot deal with a queue of data which comprises a plurality of words. Thus, the prior art apparatus cannot associate with typewriters which output a queue of data as it is operated on the keyboard, without dividing it into words.

SUMMARY OF THE INVENTION

An object of the present invention is to provide an information processor for checking data adaptable to an external device which outputs a data queue not properly divided into data blocks suitable for a specific checking purpose.

The present invention is constituted as shown in FIG. 1. Namely, the information processing system of the present invention includes: an input terminal M1 for receiving a data queue from an external device; an input buffer M2 for sequentially storing the data input from the input terminal M1; a cut-out device M3 for cutting out a block of data from a queue of data stored in the input buffer M2 with a predetermined cut-out rule; reference information store M4 for previously storing reference information on a plurality of blocks of data; a search unit M5 for searching out reference information corresponding to the block of data cut out by the cut-out device M3 from the reference information store M4; and an output terminal M6 for outputting the search result of the search means M5. Thus, it is possible to divide data queue into blocks of data and check them.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE EMBODIMENT

An embodiment of the present invention will be described hereinafter. The present invention is embodied as an information processor which executes spelling check of a text, or a queue of data, which is input from a host device, e.g., a typewriter, and is not divided into words.

Figure 1:
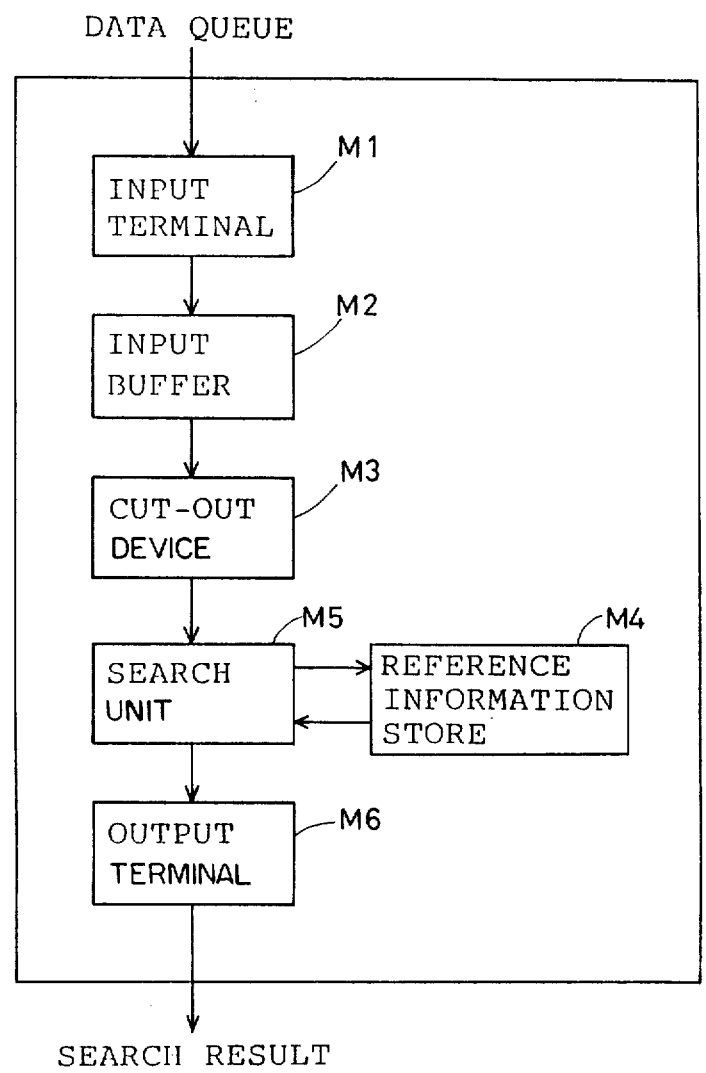
FIG. 1 is a block diagram illustrating a principle structure of the present invention.
Figure 2:
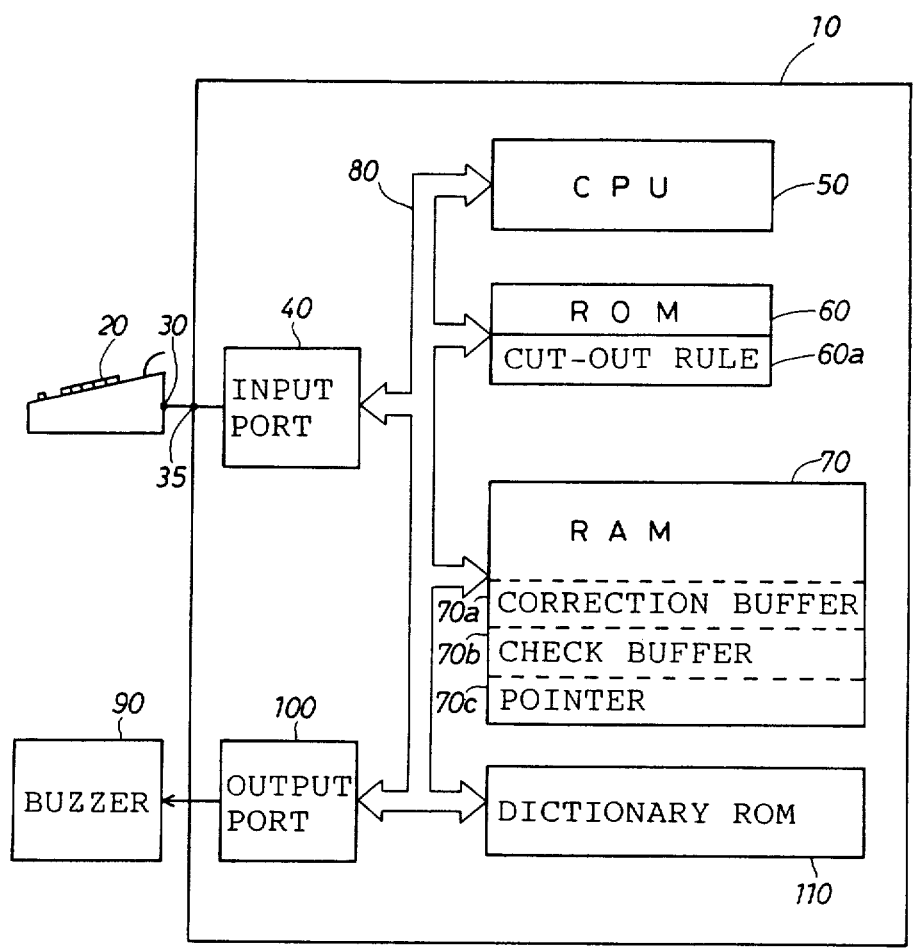
FIG. 2 is a block diagram showing a schematic structure of an information processing system as an embodiment of the present invention.

FIG. 2 is a block diagram of the information processor 10 of the present embodiment.

The processor 10 includes: an input port 40 connected to an input terminal 35 through which data is input from an output terminal 30 of a host device 20; CPU 50; ROM 60; RAM 70; a bus line 80; an output port 100 which is connected to a buzzer 90; and a dictionary ROM 110 in which reference word data are stored.

The host device 20, in this embodiment, is a typewriter which outputs data continuously from the output terminal 30. This typewriter does not have the ability to output word by word, but the letters, characters, spaces, punctuations, etc. are output as they are input by the operator on the keyboard. Therefore, the processor 10 cuts out words from the inputted text by a predetermined cut-out rule. In this embodiment, the word cut-out is done when a cut-out code as follows is found in the input text. The cut-out codes are: a space, a punctuation mark such as a comma (,), a full stop (.), a question mark (?), a semicolon (;), a colon (:), a hyphen (−), etc., a quotation mark (") or ('), a carriage return code and the like. They are selected because they are normally used to separate words in ordinary texts. The cut-out codes are stored in a cut-out rule region 60a in the ROM 60. The RAM 70 includes: a correction buffer 70a which stores a maximum of 60 bytes of information data input from the input port 40; a check buffer 70b which stores a word cut out from the data queue stored in the correction buffer 70a; and a pointer 70c for indicating an address in the correction buffer 70a normally corresponding to a printing head or a cursor of the host device 20.

Figure 3A:
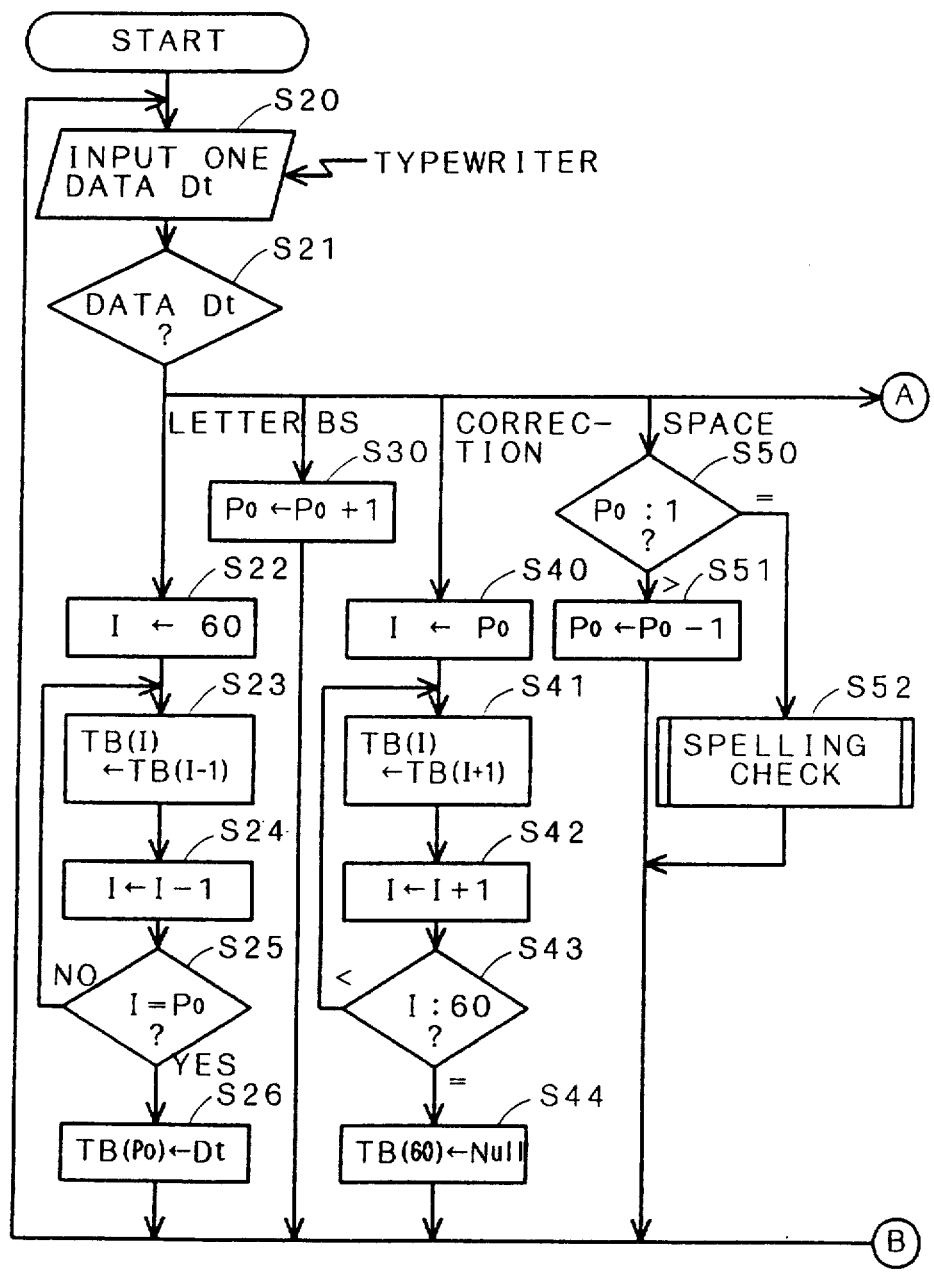
FIGS. 3A and 3B are flow charts integrally showing a routine executed in response to a data input.
Figure 3B:
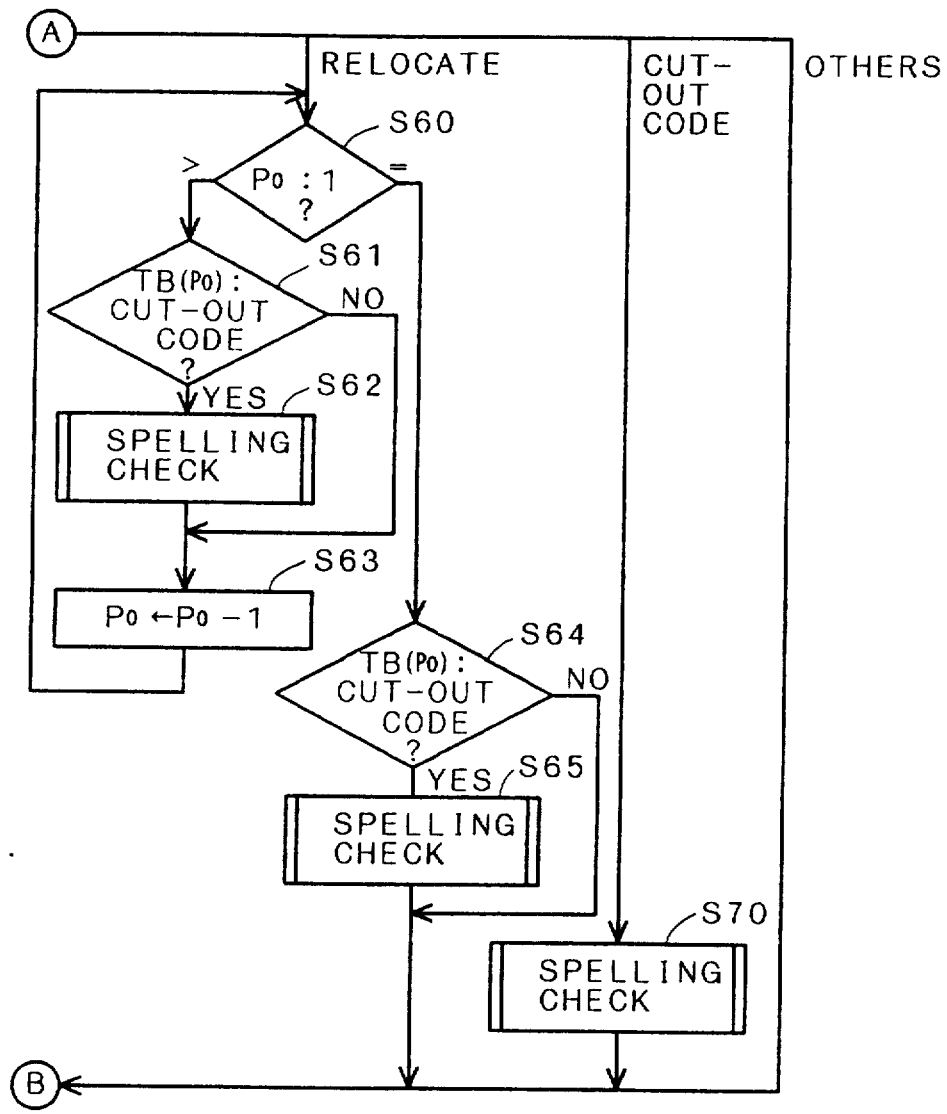
Figure 4:
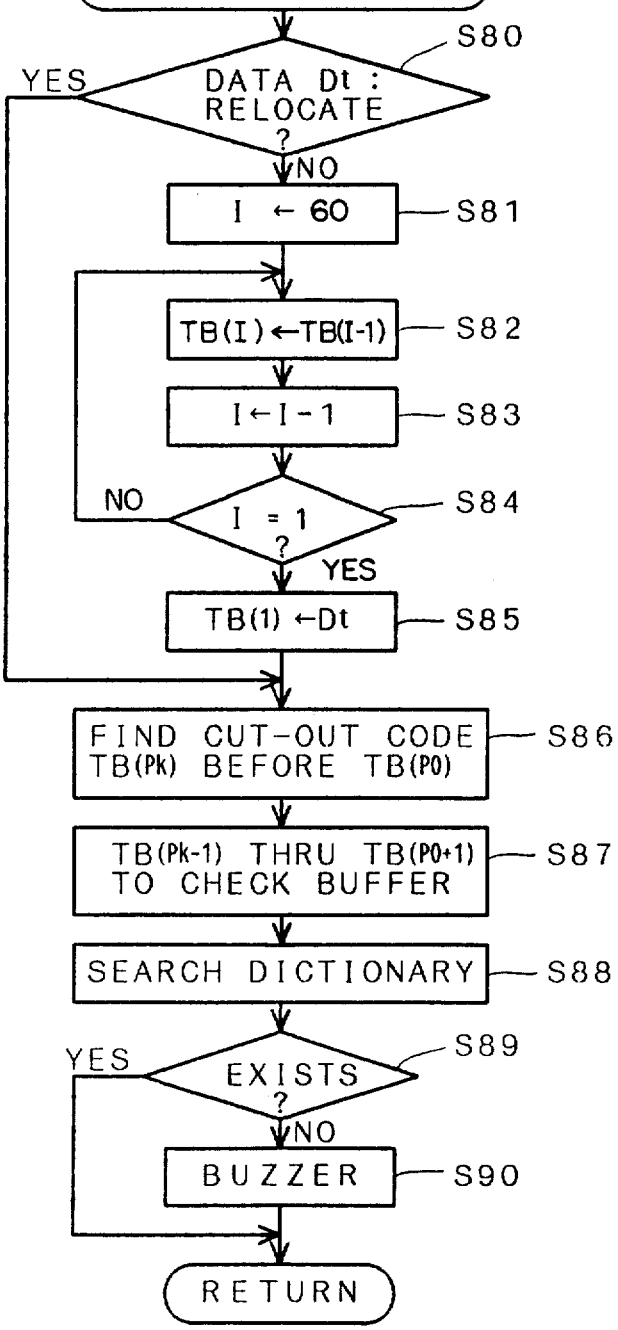
FIG. 4 is a flowchart for a spelling check routine.
Figure 5:
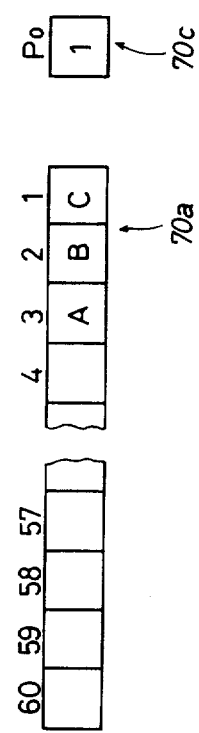
FIG. 5 is an explanatory illustration of data structure in a correction buffer and a pointer in the embodiment.

The processing of the present embodiment is executed by the CPU 50 in accordance with programs stored in the ROM 60. FIGS. 3A and 3B are flow charts which together show a routine executed in response to a data input. FIG. 4 is a flowchart for a spelling check routine. FIG. 5 shows the data structure in the correction buffer 70a where 60 data sites are addressed from 1 to 60 (address 1 is illustrated rightmost in FIG. 5.) FIG. 5 also shows that a value Po of the pointer 70c is initially 1.

Referring to FIG. 3A, when the program starts, a data Dt is input from the typewriter 20 at S20. Then, at S21, a determination is made as to what kind of data the data Dt is, in order to process it according to its kind. Hereinafter, processes of various data will be described.

If the data Dt is determined as a letter code data at S21, the process step proceeds to S22. Here "letter" includes alphabets (a, b, c, ... or A, B, C, ... ), symbols (#, $, %, ...), numerals (1, 2, 3, ...) and other subsidiary characters (|,[,=,<, ... ). The data Dt is stored in the correction buffer 70a at an address pointed by the pointer Po. If the pointer Po is 1, it means that the pointer Po points to the last item of the data queue which has already been input. By the proceedings from S22 to S25, in the correction buffer 70a, each data TB(I) before (here, "before" means leftward to in FIG. 5) a data TB(Po) pointed by the pointer Po is shifted upward (leftward in FIG. 5) by one address. Specifically, at S22, 60 is substituted for a loop counter I, where 60 is the length of the correction buffer 70a. Next, at S23, the data TB(I−1) is shifted upward to become data TB(I). Then, at S24, the counter I is decremented by 1. A determination is made at S25 if the counter I is equal to the pointer Po. If the answer is NO, the process step is looped back to S23. This procedure is continued until a determination is made at S25 that the counter I is equal to Po; then the process step goes to S26, where the data Dt is stored at an address pointed by the pointer Po, and the process step returns to S20.

If the data Dt is determined to be a back space (BS) code data at S21, the pointer Po is incremented by 1 at S30, and the process step returns to S20. Therefore, the address pointed to by the pointer Po coincides with that of the print head of the typewriter 20 or with that of the cursor if the external device has a display.

If the data Dt is determined to be a correction code data at S21, the process step goes to S40 through S44 where the data TB(Po) pointed to by the pointer Po is deleted by shifting each data TB(I) after the data TB(Po+1) downward (rightward in FIG. 5) by one address. Specifically, at S40, the value of the pointer Po is substituted for a loop counter I. Then, at S41, the data TB(I+1) is shifted to the address I to become data TB(I). Next, at S42, the counter I is incremented by 1. The counter I is compared with 60 at S43. If the counter I is less than 60, the process step is looped back to S41. This procedure is continued until a determination is made at S43 that the counter I is equal to 60; then the process step goes to S44, where a null code (NULL) is stored for the data TB(60), and the process step returns to S20.

If the data Dt is determined to be a space code data at S21, the process step goes to S50 where a determination is made if the data Dt is the last data in the correction buffer 70a. If it is not, i.e., the pointer value Po is greater than 1, the value of the pointer Po is decremented by 1 at S51. If the data Dt is the last data, i.e., the pointer Po is equal to 1, spelling check is executed at S52, since a space is a predetermined cut-out code. The procedure of spelling check will be described later. Then, the process step returns to S20.

If the data Dt is determined to be a relocate code data, the process step goes to S60 through S65 in FIG. 3B, where spelling check is executed, if necessary, with decrementing the pointer Po one by one. Here the relocate code is generated in the typewriter 20 when the operator presses a relocate key after he corrected a misprinted character in order to relocate the print head to a resuming position. Specifically, at S60, a determination is made if the pointer Po points the last data in the correction buffer 70a. If the pointer Po does not point the last data TB(1), i.e., the pointer value Po is greater than 1, a determination is made, at S61, if the data TB(Po) is a cut-out code. If the answer is YES, spelling check is executed at S62. Then, at S63, the pointer Po is decremented by 1. If the answer is NO at S61, spelling check is not executed, and the process step goes directly to S63. After the procedure from S61 to S63, the process step returns to S60 where a determination is made if the next data is the last data.

If the pointer value Po points the last data at S60, i.e., the pointer value Po is equal to 1, a further determination is made, at S64, if the data TB(Po), i.e., TB(1), is a cut-out code. If the answer is YES, spelling check is executed at S65. If the answer is NO, spelling check is not executed.

After the procedure from S60 to S65, the process step returns to S20 in FIG. 3A.

If the data Dt is determined to be a cut-out code as described before, the process step goes to S70 in FIG. 3B, where spelling check is executed. Then, the process step returns to S20 in FIG. 3A.

If the data Dt is determined to be other than the abovementioned codes at S21, the process step directly returns to S20 as shown in FIGS. 3A and 3B. Then, the next data Dt is input from the typewriter 20, and the procedure as mentioned above is repeated.

Spelling check executed at S52, S62, S65, and S70 will be described referring to FIG. 4.

First, at S80, a determination is made if the routine is caused by a relocate code. If the answer is NO, 60 is put into a loop counter I at S81. Next, at S82, The data TB(I−1) is shifted upward by one address to become data TB(I). At S83, the counter I is decremented by 1. At S84, the counter I is compared with 60. If the counter I is not equal to 1, the process step is looped back to S82. This procedure is continued until a determination is made at S84 that the counter I is equal to 1; then, at S85, the data Dt is substituted for the last data TB(1). Then, the process step goes to S86.

If the routine is determined at S80 to be started by a relocate code, steps S81 through S85 are skipped and the process step directly goes to S86.

At S86, a search is made for a cut-out code data TB(Pk) which is the nearest to, and before (leftward to) the data TB(Po) which is pointed to by the pointer Po. Then, at S87, the word formed by the data TB(Pk−1) through TB(Po+1) is transferred to the check buffer 70b. Namely, one word is cut out from the data queue of the correction buffer 70a. At S88, the word is compared with each of the reference words stored in the dictionary ROM 110. Then, at S89, a determination is made if the dictionary ROM 110 has a word which coincides with the cut-out word. If the answer is No, the buzzer 90 is beeped at S90 in order to inform the operator of the typewriter 20 that the word may be misspelled. If the answer is YES, the word is assumed as correct, and the process step is ended.

As above described, in this embodiment, a data queue from the host device 20, which is not previously divided into words, is temporarily stored in the correction buffer 70a, and spelling check is executed whenever a cut-out code such as a punctuation mark or a space is found. Therefore, in the present invention, spelling check can be executed for the host device 20 which does not divide its data into words.

The cut-out rule 60a, which is stored in the ROM 60 in this embodiment, may be transferred into the RAM 70 when the processor 10 is initialized so as to be modified by an external command.

A specific character queue may be used as a cut-out code, instead of the single cut-out codes of a space, a punctuation mark, or a quotation mark of this embodiment. Alternatively, another cut-out rule may be used that a queue of data is divided by a predetermined number of data.

Besides spelling check, if the information about inflection, synonym, and parts of speech are stored in the dictionary ROM 110, it is possible to lexically or grammatically check data from the host device 20. Additionally, the checking results may be displayed on a display.

While, in this embodiment, literal words are extracted from data by the cut-out code, a secret code or an identification number may be extracted therefrom by properly preparing the cut-out rule.

Apparently a wide variety of embodiments of this invention may be made without departing from the spirit and scope thereof, it is to be understood that the invention is not limited to the specific embodiments thereof except as defined in the appended claims.

What is claimed is:

1. A data processing apparatus separate from an electronic typewriter outputting data as a queue of data comprising:

input terminal means for receiving a queue of data from the electronic typewriter;

input buffer means for sequentially storing the data received by the input terminal means;

cut-out means for cutting out a group of data preceding a stop data as a word from said queue of data stored in the input buffer means in accordance with a predetermined cut-out rule to divide said queue of data into words, the cut-out rule being such that a block of data is cut-out when one of code data including a space code data, a punctuation code data, a hyphen code data, and a quotation mark code data follows the block of data;

reference information store means for storing correct spellings of a plurality of words;

search means for searching out a reference information corresponding to the block of data cut-out by the cut-out means from the reference information store means;

output means for outputting a search result at the search means; and data correction means responsive to a correction command from the electronic typewriter for correcting data in the queue of data in the input buffer means, said data correction means including:

a pointer memory for indicating an address of the input buffer means, the pointer memory normally pointing to an address representing one end of the input buffer means;

backspace means responsive to a backspace code data from the electronic typewriter for proceeding the address in the pointer memory toward the other end of the input buffer means;

delete means responsive to a correction code data from the electronic typewriter for shifting the queue of data between the address pointed to by the pointer memory and said other end of the input buffer means toward said one end of the input buffer means by one address.

2. A data processing apparatus according to claim 1, wherein said one end is assigned with a lowest address and said other end is assigned with a highest address in the input buffer means.

* * * * *